(12) United States Patent
Abe et al.

(10) Patent No.: US 8,534,649 B2
(45) Date of Patent: Sep. 17, 2013

(54) MOUNT STRUCTURE FOR VEHICLE DAMPER

(75) Inventors: Kazunori Abe, Saitama (JP); Kosuke Uemori, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/809,420

(22) PCT Filed: Jul. 6, 2011

(86) PCT No.: PCT/JP2011/065438
§ 371 (c)(1),
(2), (4) Date: Jan. 10, 2013

(87) PCT Pub. No.: WO2012/011386
PCT Pub. Date: Jan. 26, 2012

(65) Prior Publication Data
US 2013/0113145 A1 May 9, 2013

(30) Foreign Application Priority Data
Jul. 20, 2010 (JP) .................................. 2010-162851

(51) Int. Cl.
*F16F 11/00* (2006.01)
(52) U.S. Cl.
USPC ........................ 267/220; 267/33; 280/124.155

(58) Field of Classification Search
USPC ....... 188/322.12, 321.11, 322.22; 267/33–35, 267/220, 221; 280/124.147, 124.155
See application file for complete search history.

(56) References Cited

U.S. PATENT DOCUMENTS

| 4,796,870 A | 1/1989 | Hoffman et al. |
| 6,749,047 B2 * | 6/2004 | Koyano et al. ............ 188/321.11 |
| 6,883,651 B2 * | 4/2005 | Fukaya ..................... 188/322.12 |
| 7,347,414 B2 * | 3/2008 | Groves ........................... 267/220 |
| 2013/0113145 A1 * | 5/2013 | Abe et al. ...................... 267/220 |

FOREIGN PATENT DOCUMENTS

| JP | 55-152937 A | 11/1980 |
| JP | S58-063441 U | 4/1983 |
| JP | 63-308236 A | 12/1988 |
| JP | 2001-065624 A | 3/2001 |
| JP | 2007-032732 A | 2/2007 |
| JP | 2009-078750 A | 4/2009 |

* cited by examiner

*Primary Examiner* — Christopher Schwartz
(74) *Attorney, Agent, or Firm* — Carrier Blackman & Associates, P.C.; Joseph P. Carrier; William D. Blackman

(57) ABSTRACT

A mount structure for a vehicle damper, configured in such a manner that an end of the piston rod (33) of the damper (17) is supported by a vehicle-side member (51). A nut (57) engaged with the male thread section (42) formed on a reduced diameter section (41) of the piston rod (33) collectively fastens upper and lower gripping members (55, 56), a collar member (54), and upper and lower elastic sections (52, 53) to the reduced diameter section (41). An input from the damper body (38) side is transmitted to the vehicle body-side member (51) through a transmission member (58).

16 Claims, 8 Drawing Sheets

(a) FIRST COMPARATIVE CONVENTIONAL EXAMPLE (b) FIRST EMBODIMENT (a) SECOND COMPARATIVE CONVENTIONAL EXAMPLE (b) SECOND EMBODIMENT

MOUNT STRUCTURE FOR VEHICLE DAMPER

TECHNICAL FIELD

The present invention relates a mount structure for a vehicle damper, i.e. a vehicle damper mount structure, in which a damper comprises a damper body and a piston rod and the piston rod is supported at an end portion by a vehicle-body-side member via an elastic member.

BACKGROUND ART

Among the conventionally-known vehicle damper mount structures is an input-separation type damper mount in which an elastic member for attenuating vibration input from a piston rod, members for supporting a vehicle body load and an elastic member for attenuating vibration input for example from a coil spring to the vehicle body are provided separately from one another. Also known is a damper mount structure in which an input from a bump stopper, which is subject to an impact during compression of a damper, as well as an input from the coil spring is attenuated separately from an input to the piston rod (see, for example, patent literature 1).

With the aforementioned vehicle damper mount structure, an input from the piston rod and an input from the coil spring or the bump stopper can be transmitted to the vehicle body separately from each other.

Patent literature 1 discloses a construction of the damper mount for attenuating an input from the damper during transmission to the vehicle body. Namely, the disclosed damper mount is of the input-separation type which is constructed to prevent, through separation of inputs, a plurality of inputs from being applied to a single elastic member and secure a compression allowance for the elastic member, to thereby allow the damper mount to achieve a maximum attenuation effect.

Further, in the damper mount structure disclosed in patent literature 1, the piston rod is fixed to an inner cylinder by means of a fastening member (nut), and outer metal fittings, to which an input from the coil spring is transmitted, are mounted to the vehicle body by means of a bolt.

However, in the case where the fastening sections are provided separately as above, not only necessary fastening operations tend to become complicated but also a space for mounting bolts of the outer metal fittings is required, which would adversely influence a layout freedom of components on the vehicle body.

PRIOR ART LITERATURE

Patent literature 1: Japanese Patent Application Laid-Open Publication No. 2001-65624

SUMMARY OF INVENTION

Technical Problem

It is therefore an object to provide a vehicle damper mount structure which not only can achieve an improved layout freedom of the damper body but also can reduce deterioration of attenuating performance that would be caused due to compression of the elastic member. Namely, the present invention seeks to provide a vehicle damper mount structure which can achieve both an improved layout freedom of the damper body and reduced deterioration of the attenuating performance of the damper body.

Solution to Problem

According to claim 1 of the instant application, there is provided a vehicle damper mount structure in which a damper comprises a damper body and a piston rod and the piston rod is supported at an end portion by a vehicle-body-side member, which comprises: the piston rod having a reduced-diameter section having a smaller outer diameter than a remaining section of the piston rod, and a male thread section formed on a distal end portion of the reduced-diameter section; upper and lower elastic sections threaded over the reduced-diameter section and sandwiching therebetween the vehicle-body-side member; a collar member threaded over the reduced-diameter section and extending through the upper and lower elastic sections to thereby define a tightening margin of the upper and lower elastic sections; upper and lower sandwiching members threaded over the reduced-diameter section and sandwiching therebetween the upper and lower elastic sections from outside; a fastening member screwed on the male screw section to collectively fasten the upper and lower sandwiching members, the collar member and the upper and lower elastic sections to the reduced-diameter section; and a transmission member provided concentrically with the piston rod for transmitting an input from the damper body to the vehicle-body-side member.

According to claim 2, the damper includes a coil spring provided concentrically with the piston rod and supporting the vehicle-body-side member, and the vehicle damper mount structure further comprises a bracket provided underneath the transmission member for transmitting an input from the coil spring to the transmission member.

According to claim 3, the transmission member has an upper portion biting into and supported in the lower elastic section.

According to claim 4, the damper includes a bump stopper threaded over the piston rod for lessening an input from the damper body, and the transmission member is provided between the bump stopper and the lower elastic section, and the vehicle damper mount structure further comprises a connecting elastic section abutting against the vehicle-body-side member and elastically interconnecting the transmission member and the lower sandwiching member.

According to claim 5, the bumper stopper includes a bump rubber for lessening an input from the dumper body, and a case retaining the bump rubber, and the case has also a transmission function of the transmission member.

According to claim 6, the transmission member, the collar member, the lower sandwiching member, the lower elastic section and the case are formed integrally.

Advantageous Effects of Invention

According to claim 1, the upper and lower sandwiching members, the collar member and the upper and lower elastic sections are collectively fastened to the reduced-diameter section. Thus, the damper can be supported by the vehicle-body-side member only at one point by means of the fastening member. In this way, the present invention allows a damper fastening operation to be performed with an improved operability.

An input from the piston rod is transmitted to the whole of the upper and lower elastic sections via the collar member and the upper and lower sandwiching members, and an input from the damper body is transmitted to the vehicle-body-side member via the transmission member. Thus, in the present invention, such inputs are not transmitted to the upper and lower elastic sections. Namely, because the input from the piston rod and the input from the damper body are separated from each other, it is possible to avoid the elastic members (upper and lower elastic sections) from being readily brought to a compressed state, thereby reducing deterioration of the attenuating performance of the damper. As a result, the present invention can achieve both an improved layout freedom of the damper and reduced deterioration of the attenuating performance of the damper.

According to claim 2, not only an input from the damper body but also an input from the coil spring can be transmitted to the vehicle-body-side member via the transmission member. Thus, deterioration of the attenuating performance of the upper and lower elastic sections can be reduced more effectively.

According to claim 3, transmission of vibration to the vehicle-body-side member can be reduced because the upper portion of the transmission member bites into and supported in the lower elastic section.

According to claim 4, vibration transmitted from the bump stopper can be attenuated by the provision of the connecting elastic section elastically interconnecting the transmission member and the lower sandwiching member. Further, with the connecting elastic section elastically interconnecting the transmission member and the lower sandwiching member, the input from the bump stopper is hardly transmitted to the lower elastic section. In this way, the present invention can secure a sufficient compression margin as an input-separation type damper mount.

According to claim 5, the case, also having the transmission function of the transmission member, can eliminate a need to provide a separate transmission member. As a result, it is possible to reduce the cost of the vehicle damper mount structure.

According to claim 6, the present invention can achieve an improved assemblability of the vehicle damper mount structure because the transmission member, the collar member, the lower sandwiching member, the lower elastic section and the case are formed integrally.

DESCRIPTION OF EMBODIMENTS

Figure 1:
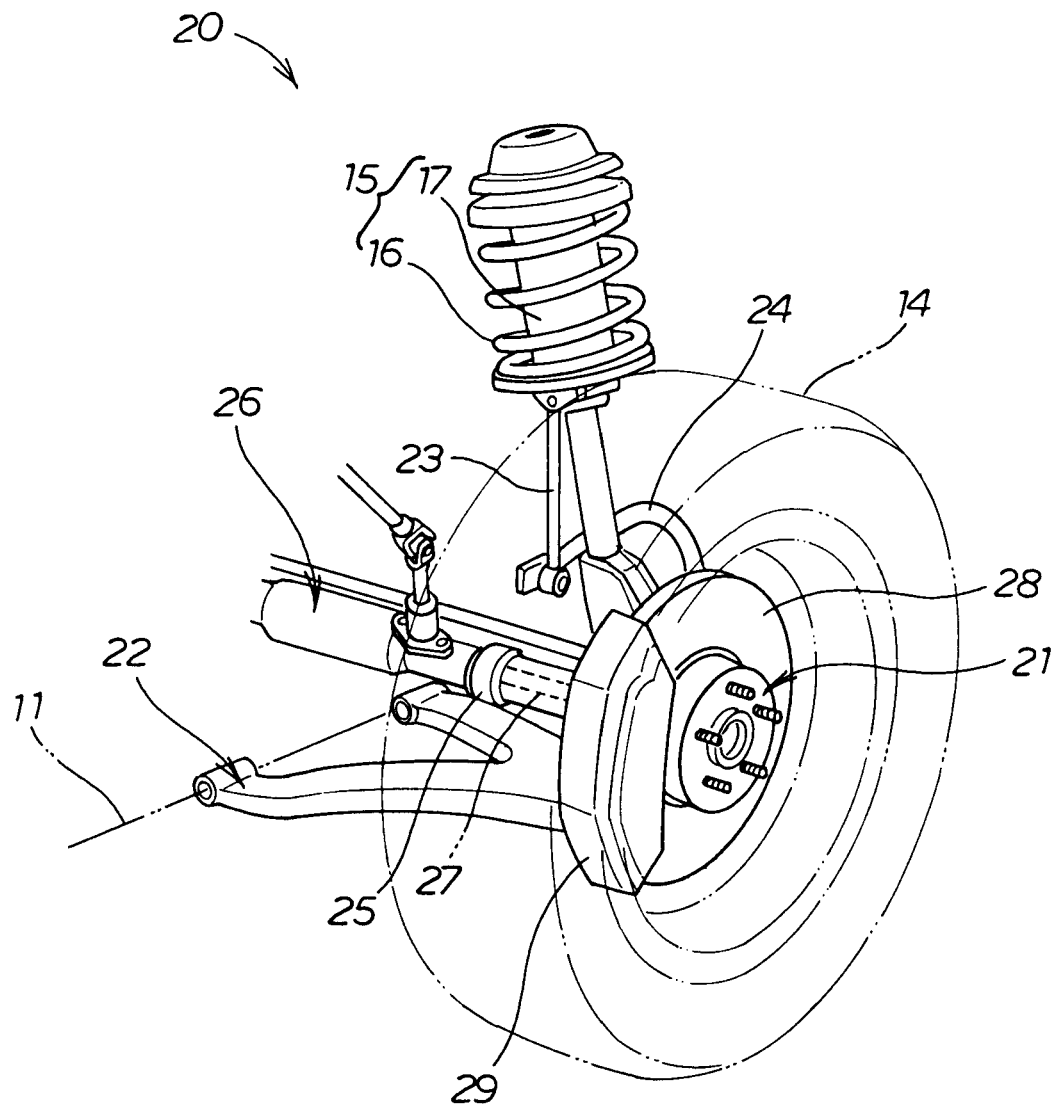
FIG. 1 is a perspective view showing a suspension apparatus provided with a vehicle damper employing a damper mount structure of the present invention.
Figure 2:
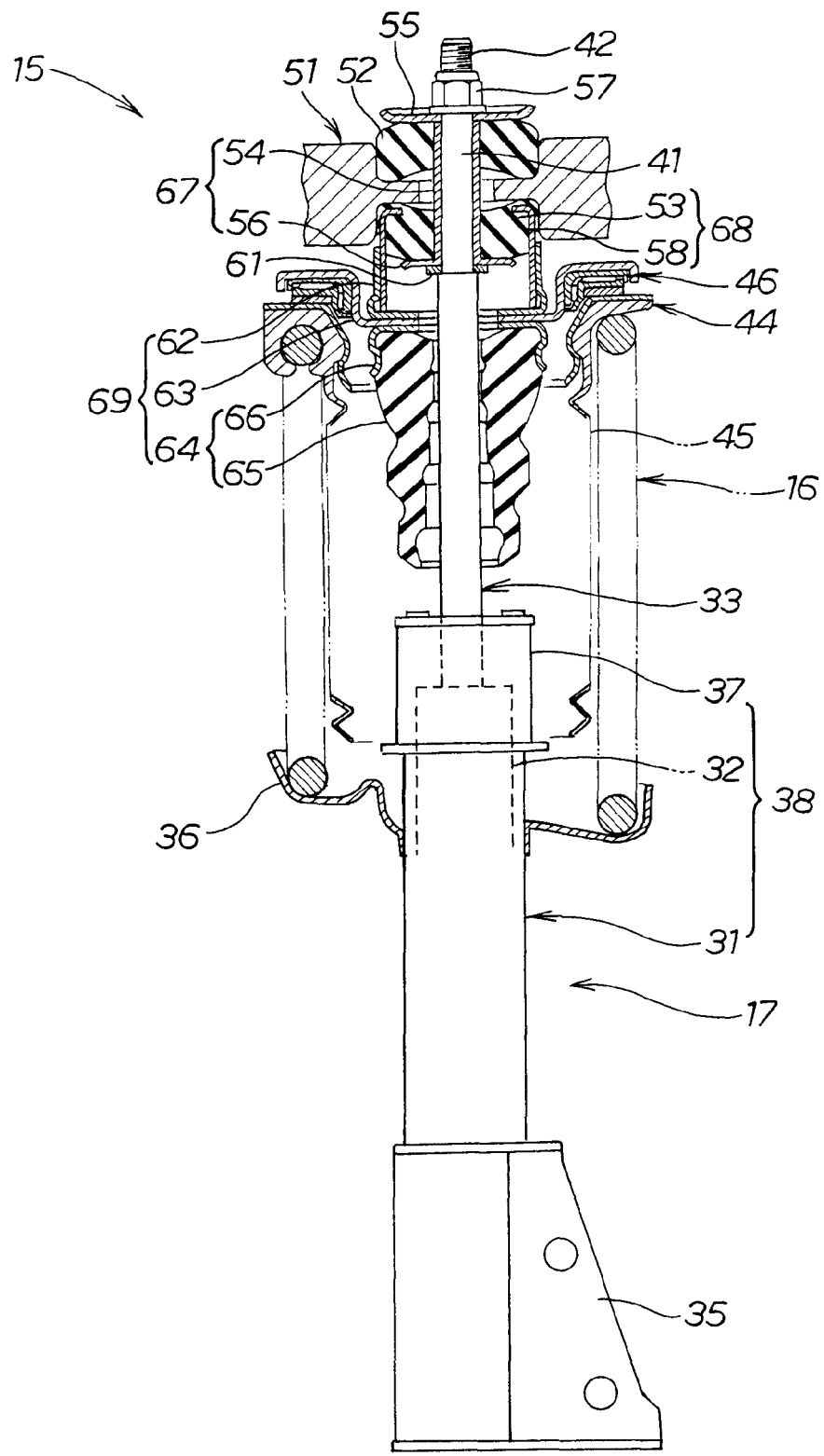
FIG. 2 is a sectional view of a damper unit employing a first embodiment of the damper mount structure of the present invention.

Referring to FIGS. 1 and 2, a suspension apparatus 20 is a front suspension of a strut type in which a wheel 14 is pivotably mounted to a vehicle body 11.

More specifically, the suspension apparatus 20 includes: a lower arm 22 of a generally A shape extending from the vehicle body 11 to a knuckle 21; a damper unit (shock absorber) 15 provided between the vehicle body 11 and the knuckle 21; and an anti-roll bar link 24 connected to the damper unit 15 via an anti-roll bar 23.

A wheel body (not shown) of the wheel 14 is mounted to the knuckle 21, and a tie rod 27 of a steering gearbox 26 for tilting the wheel 14 leftward or rightward relative to a front-rear direction of the vehicle body is connected to the knuckle 21. Further, a brake disk 28 for braking the wheel 14 is provided around the knuckle 21. A boot 25 for preventing adhesion of mud and rainwater is put around the tie rod 27. A brake caliper 29 supported by the vehicle body 11 for stopping the brake disk 28 is provided around an outer peripheral portion of the brake disk 28.

As shown in FIG. 2, the damper unit 15 is a hydraulic shock absorber of a strut type which includes a coil spring 16 for absorbing an input from the wheel 14, and a damper (vehicular damper) 17 for softening movement of the coil spring 16.

The damper 17 includes a damper body 38, and a piston rod 33 inserted in the damper body 38. The damper body 38 includes a cylinder 32 along which the piston rod 33 slides, an outer tube 31 accommodating therein the cylinder 32, and a stopper cap 37 for abutting against a bump stopper 64. The outer tube 31 includes a mounting stay 35 mounted to the suspension apparatus 20, and a spring support section 36 supporting one end of the coil spring 16.

The piston rod 33 has a reduced-diameter section 41 having a smaller outer diameter than the remaining section of the piston rod 33, and a male thread section 42 formed on a distal end portion of the reduced-diameter section 41.

In the damper unit 15, the one end of the coil spring 16 is set on the spring support section 36 of the outer tube 31, and a bracket 63 is set on the other end of the coil spring 16 via a spring sheet 44. Further, a bump stopper assembly 69 is set on the bracket 63 via a damper member 46. A washer 61 is set on the reduced-diameter section 41 of the piston rod 33, and a flanged cylinder 67 is set on the reduced-diameter section 41. Further, an elastic section assembly 68 is set on the flanged cylinder 67 and pressed in the bump stopper assembly 69. In this state, a distal end portion of the piston rod 33 is inserted into a vehicle-body-side member 51, and an upper elastic section 52 is set in the flanged cylinder 67. The vehicle-body-side member 51 is sandwiched between a lower elastic section 53 and the upper elastic section 52, and an upper gripping or sandwiching member 55 is set on the upper elastic section 52. Further, a fastening member (nut) 57 is screwed on the male thread section 42 to complete mounting of the piston rod 33 to the vehicle-body-side member 51.

As will be later described, the spring sheet 44 has a dust cover 45 formed integrally therewith. The flanged cylinder 67 integrally has a lower sandwiching member 56 and a collar member 54. The elastic section assembly 68 comprises the lower elastic section 53 and a transmission member 58 assembled integrally with each other. The bump stopper assembly 69 comprises the bracket 63 retaining the coil spring 16, the bump stopper 64 composed of an elastic bump rubber 65 and a case 66, and a cylinder member 62 in which the transmission member 58 is pressed.

In the most compressed state of the damper unit (hydraulic damper) 15, the stopper cap 37 of the outer tube 31 abuts against the bump stopper 64 to restrict a maximum compressed stroke of the damper unit 15.

The dust cover 45 is formed integrally with the spring sheet 44 in such a manner that the outer tube 31 and the piston rod 33 are covered with the dust cover 45.

Namely, the damper unit 15 compresses and contracts in such a manner as to absorb, by resilient force of the coil spring 16, an impact applied to the vehicle from a road surface. Vibration of the damper unit 15 produced due to the compression and contraction of the damper unit 15 can be promptly suppressed by attenuating force produced as the piston (not shown) moves vertically or in an up-down direction in response to the compression and contraction.

The following describe various examples of a construction for mounting the piston rod 33 to the vehicle-body-side member 51, as first to fifth embodiments of the vehicle damper mount structure of the present invention.

Figure 3:
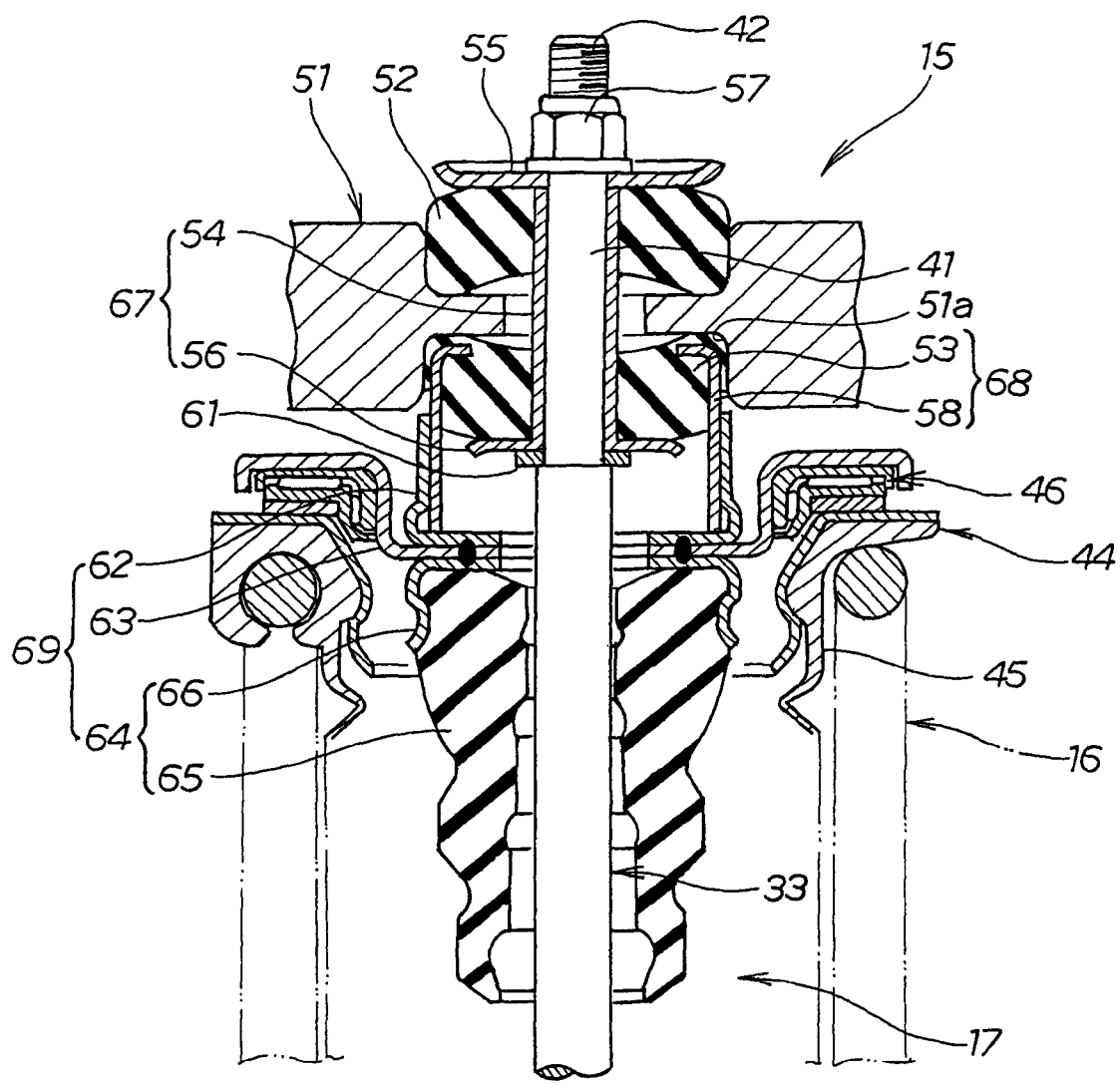
FIG. 3 is an enlarged sectional view of the damper unit shown in FIG. 2.

As shown in FIG. 3, the first embodiment of the vehicle damper mount structure includes the upper and lower elastic sections 52 and 53, the collar member 54, the upper and lower sandwiching members 55 and 56, the fastening member 57, the transmission member 58, the washer 61, the cylinder member 62, the bracket 63, and the bump stopper 64.

The upper and lower elastic sections 52 and 53 sandwich therebetween the vehicle-body-side member 51. The collar member 54 is threaded over the reduced-diameter section 41 and extends through the upper and lower elastic sections 52 and 53 to thereby define a tightening margin of the upper and lower elastic sections 52 and 53. The upper and lower sandwiching members 55 and 56 are threaded over the reduced-diameter section 41 and sandwich therebetween the upper and lower elastic sections 52 and 53 from outside. The fastening member 57 is screwed on the male screw section 42 to collectively fasten the upper and lower sandwiching members 55 and 56, collar member 54 and upper and lower elastic sections 52 and 53 to the reduced-diameter section 41. The transmission member 58 is provided concentrically with the piston rod 33 for transmitting an input from the damper body 38 (FIG. 2) to the vehicle-body-side member 51. The washer 61 is threaded over the reduced-diameter section 41 and set underneath the lower elastic section 53. The cylinder member 62 is provided under the transmission member 58 with the transmission member 58 pressed in the cylinder member 62. Further, the bracket 63 is provided under the cylinder member 62. The bump stopper 64 is provided under the bracket 63 for lessening an input from the dumper body 38.

The collar member 54 and the lower sandwiching member 56 are formed integrally with each other to together constitute the flanged cylinder 67. Further, the lower elastic section 53 and the transmission member 58 are assembled integrally to together constitute the elastic section assembly 68. The transmission member 58 has an upper portion biting into and supported in the lower elastic section 53.

The bumper stopper 64 includes the elastic bump rubber 65 for not only restricting the maximum compressed stroke of the damper (vehicle damper) 17 but also lessening an input from the dumper body 38 (FIG. 2), and the case 66 retaining the bump rubber 65. In the bump stopper assembly 69, the cylinder member 62 and the case 66 are spot-welded to the bracket 63, and the bump rubber 65 is secured to the case 66.

The upper and lower elastic sections 52 and 53 are formed of an elastic material, such as rubber. The transmission member 58 transmits, to the vehicle-body-side member 51, an input applied from the coil spring 16 to the bracket 63 and an input from the damper body 38 (FIG. 2).

The bracket 63 transmits the input from the coil spring 16 to the vehicle-body-side member 51 via the spring sheet 44 and damper member 46, but also transmits the input from the damper body 38 (FIG. 2) to the vehicle-body-side member 51 via the bump stopper 64.

Figure 4:
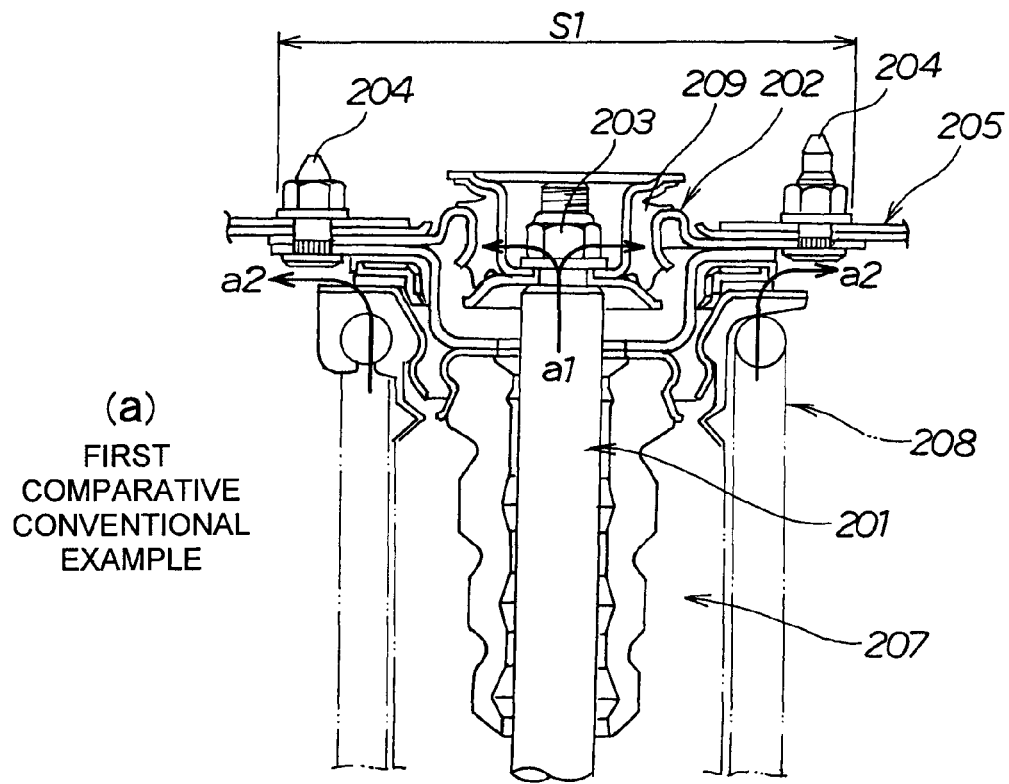
FIG. 4 is a view showing a damper unit employing a first comparative conventional example and the damper unit employing the first embodiment of the present invention.
Figure 4:
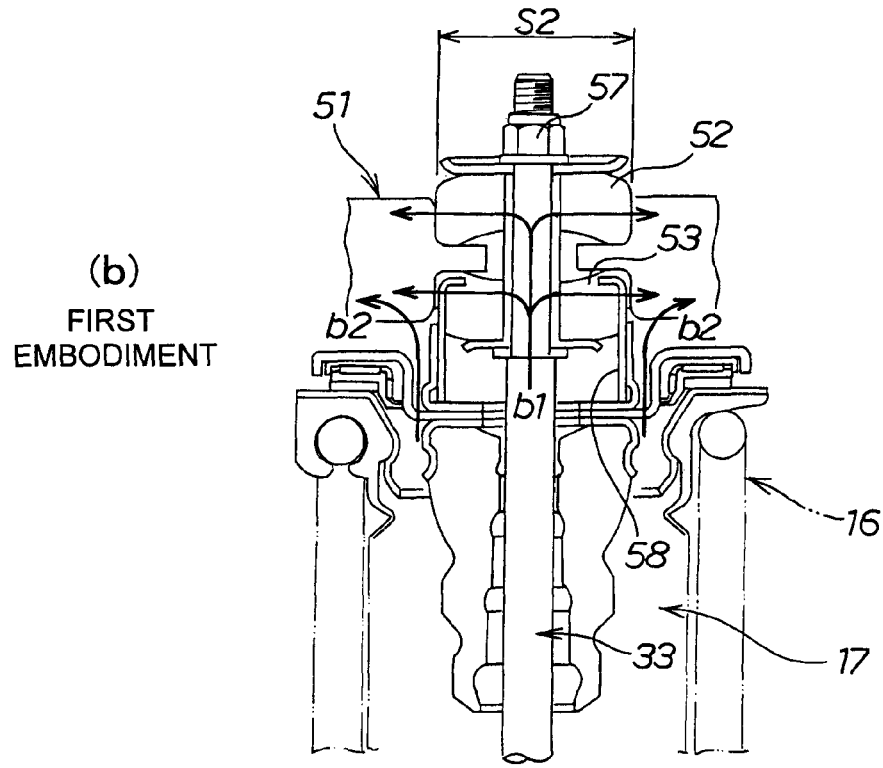

As shown in (a) of FIG. 4, a first comparative conventional example of a damper mount structure includes a piston rod 201 fastened to the center of a mounting bracket assembly 202 by means of a fastening member 203. The piston rod 201 is also fastened to a vehicle-body-side member 205 by means of a plurality of embedded bolts 204 provided diametrically outwardly of the mounting bracket assembly 202.

Thus, in the first comparative conventional example of the damper mount structure, an input from the piston rod 201 is transmitted to the vehicle-body-side member 205 by way of the mounting bracket assembly 202 as indicated by arrow a1, and inputs from a damper body (not shown) of a vehicle damper 207 and from a coil spring 208 are transmitted directly to the vehicle-body-side member 205 as indicated by arrow a2. Thus, the input from the damper body (not shown) of the vehicle damper 207 and the input from the coil spring 208 are not applied to an elastic member 209 on the piston rod 201, so that it is possible to reduce deterioration of attenuating performance of the elastic member 209. However, a wide mounting space would be required as indicated by S1, which would adversely influence a layout freedom of the damper 207.

In the first embodiment of the damper mount structure, as shown in (b) of FIG. 4, an input from the piston rod 33 is transmitted to the vehicle-body-side member 51 by way of the upper and lower elastic sections 52 and 53 as indicated by arrow b1, and inputs from the damper body 38 (FIG. 2) of the damper 17 and from the coil spring 16 are transmitted directly to the vehicle-body-side member 51 via the transmission member 58 as indicated by arrow b2. Thus, the input from the damper body 38 of the damper 17 and the input from the coil spring 16 are not applied to the upper and lower elastic sections 52 and 53 on the piston rod 33, so that it is possible to reduce deterioration of attenuating performance of the upper and lower elastic sections 52 and 53.

Further, as regards a necessary mounting space, a necessary mounting range S2 of the first embodiment of the damper mount structure is smaller than the mounting range S1 of the first comparative conventional example of the damper mount structure ((a) of FIG. 4) (i.e., S2<S1). Thus, there can be achieved an improved layout freedom of the vehicle damper 17. Further, the damper 17 can be supported by the vehicle-body-side member 51 only at one point by means of the fastening member 57. In this way, the instant embodiment allows an operation for fastening the damper body 17 to be performed with an improved operability.

Further, in the first embodiment of the damper mount structure, as shown in FIGS. 2, 3 and (b) of FIG. 4, the damper 17 comprises the damper body 38 and the piston rod 33, and the piston rod 33 is supported at its end portion by the vehicle-body-side member 51. The piston rod 33 has the reduced-diameter section 41 having a smaller outer diameter than the remaining section of the piston rod 33, and the male thread section 42 formed on the distal end portion of the reduced-diameter section 41.

Further, the first embodiment of the damper mount structure includes: the upper and lower elastic sections 52 and 53 threaded over the reduced-diameter section 41 and sandwiching therebetween the vehicle-body-side member 51; the collar member 54 threaded over the reduced-diameter section 41 and extending through the upper and lower elastic sections 52 and 53 to thereby define the tightening margin of the upper and lower elastic sections 52 and 53; the upper and lower sandwiching members 55 and 56 threaded over the reduced-diameter section 41 and sandwiching therebetween the upper and lower elastic sections 52 and 53 from outside; the fastening member 57 screwed on the male screw section 42 to collectively fasten the upper and lower sandwiching members 55 and 56, collar member 54 and upper and lower elastic sections 52 and 53 to the reduced-diameter section 41; and the transmission member 58 provided concentrically with the piston rod 33 for transmitting an input from the damper body 38 to the vehicle-body-side member 51. Thus, the damper 17 can be supported by the vehicle-body-side member 51 only at one point by means of the fastening member 57. In this way, the instant embodiment allows the operation for fastening the damper body 17 to be performed with an improved operability, but also permits an improved layout freedom of the damper 17.

An input from the piston rod 33 is transmitted to the whole of the upper and lower elastic sections 52 and 53 via the collar member 54 and the upper and lower sandwiching members 55 and 56, and an input from the damper body 38 is transmitted to the vehicle-body-side member 51 via the transmission member 58. Thus, such inputs are not transmitted to the upper and lower elastic sections 52 and 53. Namely, because the input from the piston rod 33 and the input from the damper body 38 are separated from each other, it is possible to avoid the elastic members (upper and lower elastic sections 52 and 53) from being readily brought to a compressed state, thereby reducing deterioration of the attenuating performance of the damper 17. As a result, the instant embodiment can achieve both an improved layout freedom of the damper 17 and reduced deterioration of the attenuating performance of the damper 17.

Further, as noted above, the damper 17 includes the coil spring 16 provided concentrically with the piston rod 33 and supporting the vehicle-body-side member 51, and the bracket 63 for transmitting an input from the coil spring 16 to the transmission member 58 is provided underneath the transmission member 58. Thus, not only the input from the damper body 38, but also the input from the coil spring 16 can be transmitted to the vehicle-body-side member 51 via the transmission member 58. As a result, deterioration of the attenuating performance of the upper and lower elastic sections 52 and 53 can be reduced more effectively.

Furthermore, because the transmission member 58 has the upper portion biting into and supported in the lower elastic section 53, transmission of vibration to the vehicle-body-side member 51 can be reduced.

Second Embodiment

Figure 5:
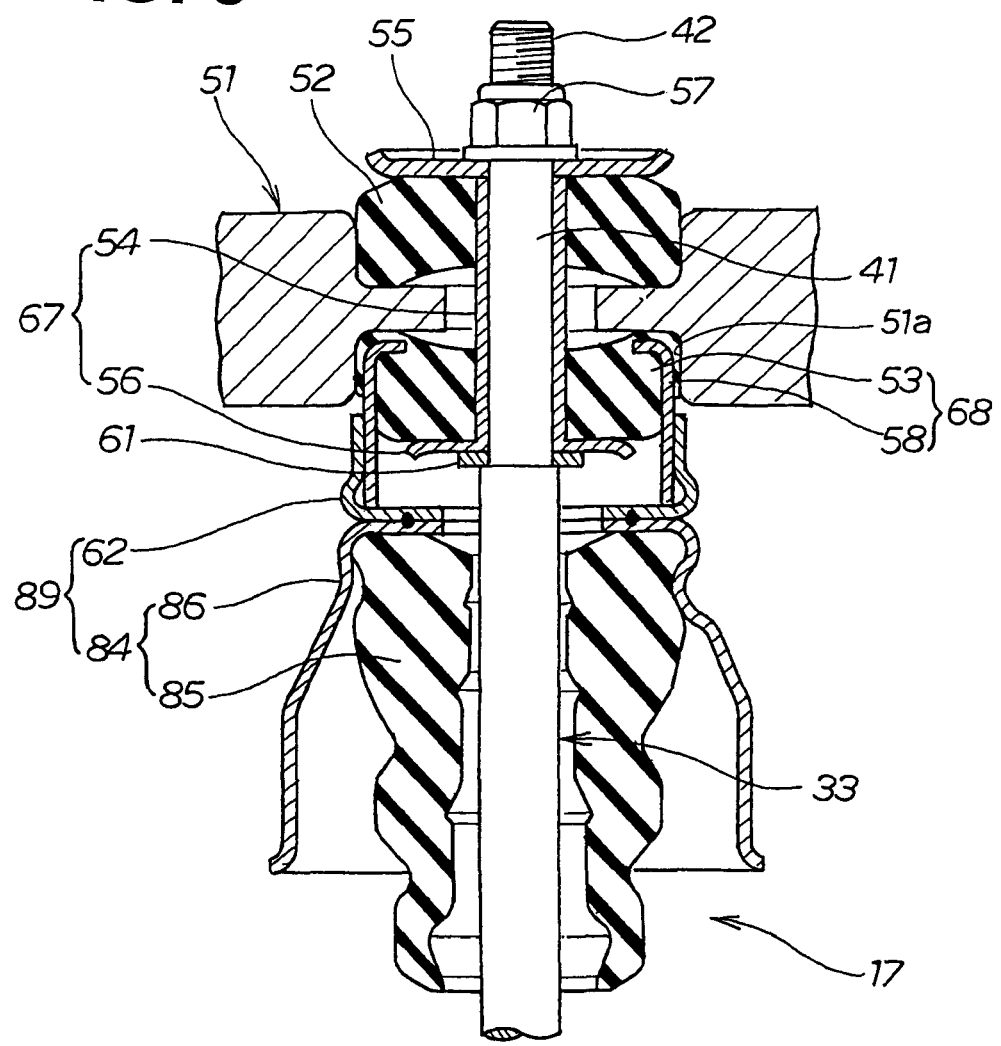
FIG. 5 is a sectional view showing a damper unit employing a second embodiment of the present invention.

A second embodiment of the damper mount structure shown in FIG. 5 is different from the first embodiment in that the coil spring 16 provided in the first embodiment is removed from the second embodiment of the damper mount structure. Similar elements to those in the first embodiment are indicated by the same reference numerals as used for the first embodiment and will not be described here to avoid unnecessary duplication.

The second embodiment of the damper mount structure shown in FIG. 5 includes: the upper and lower elastic sections 52 and 53; the collar member 54; the upper and lower sandwiching members 55 and 56; the fastening member 57; the transmission member 58; the washer 61; the cylinder member 62; the bracket 63; and a bump stopper 84. The collar member 54 and the lower sandwiching member 56 are formed integrally with each other to constitute the flanged cylinder 67.

The bumper stopper 84, which restricts the maximum compressed stroke of the damper 17, includes a bump rubber 85 for lessening an input from the dumper body 38 (FIG. 2), and a case 86 retaining the bump rubber 85. In a bump stopper assembly 89, the case 62 is spot-welded to the cylinder member 62, and the bump rubber 85 is secured to the case 86.

Figure 6:
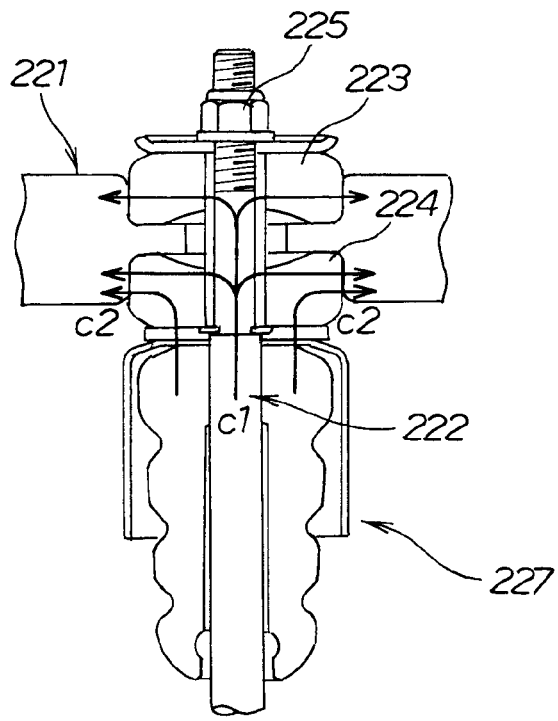
FIG. 6 is a view comparatively showing, by way of comparison, a damper unit employing a second comparative conventional example and a damper unit employing a second embodiment of the present invention.
Figure 6:
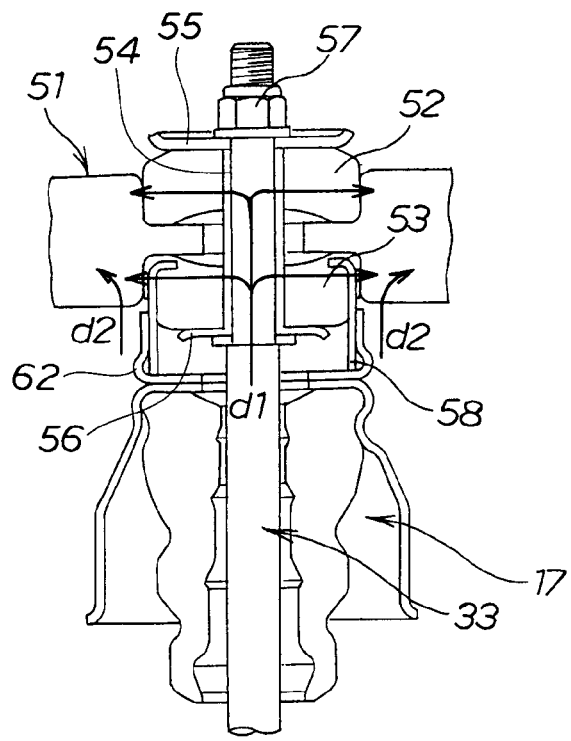

As shown in (a) of FIG. 6, a second comparative conventional example of a damper mount structure includes a piston rod 222 fastened to a vehicle-body-side member 221 by means of a fastening member 225 via upper and lower elastic sections 223 and 224. Namely, a damper 227 can be supported by the vehicle-body-side member 221 only at one point by means of the fastening member 225.

However, in the second comparative conventional example of the damper mount structure, an input from the piston rod 221 is transmitted to the vehicle-body-side member 221 by way of the upper and lower elastic sections 223 and 224 as indicated by arrow c1, and an input from the damper body (not shown) of the vehicle damper 227 too is transmitted to the vehicle-body-side member 221 as indicated by arrow c2 by way of the lower elastic section 224. As a consequence, the elastic members (upper and lower elastic sections 223 and 224) are brought to a compressed state, so that the attenuating performance of the vehicle damper 227 may undesirably deteriorate.

In the second embodiment of the damper mount structure, as shown in (b) of FIG. 6, the piston rod 33 is mounted to the vehicle-body-side member 51 via the upper and lower elastic sections 52 and 53, and the transmission member 58 is provided between the cylindrical member 62 and the vehicle-body-side member 51 for transmitting an input from the damper body 38 (FIG. 2) directly to the vehicle-body-side member 51.

Thus, the damper 17 can be supported by the vehicle-body-side member 51 only at one point by means of the fastening member 57. In this way, the instant embodiment allows the fastening operation to be performed with an improved operability, but also permits an improved layout freedom of the damper 17.

In the second embodiment of the damper mount structure (FIG. 5 and (b) of FIG. 6), an input from the piston rod 33 is transmitted to the vehicle-body-side member 51 by way of the upper and lower elastic sections 52 and 53 as indicated by arrow d1, and an input from the damper body 38 (FIG. 2) of the damper 17 is transmitted directly to the vehicle-body-side member 51 via the transmission member 58 as indicated by arrow d2. Because the input from the damper body 38 of the damper 17 is not applied to the upper and lower elastic sections 52 and 53 on the piston rod 33, it is possible to reduce deterioration of the attenuating performance of the upper and lower elastic sections 52 and 53.

An input from the piston rod 33 is transmitted to the whole of the upper and lower elastic sections 52 and 53 via the collar member 54, upper and lower sandwiching members 55 and 56. Because an input from the damper body 38 is transmitted to the vehicle-body-side member 51 via the transmission member 58, the input is not transmitted to the upper and lower elastic sections 52 and 53. Namely, because the input from the piston rod 33 and the input from the damper body 38 are separated from each other, it is possible to avoid the elastic members (upper and lower elastic sections) 52 and 53 from being readily brought to a compressed state, thereby reducing deterioration of the attenuating performance of the damper 17. As a result, the instant embodiment can achieve both an improved layout freedom of the damper 17 and reduced deterioration of attenuating performance of the damper 17.

Third Embodiment

Figure 7:
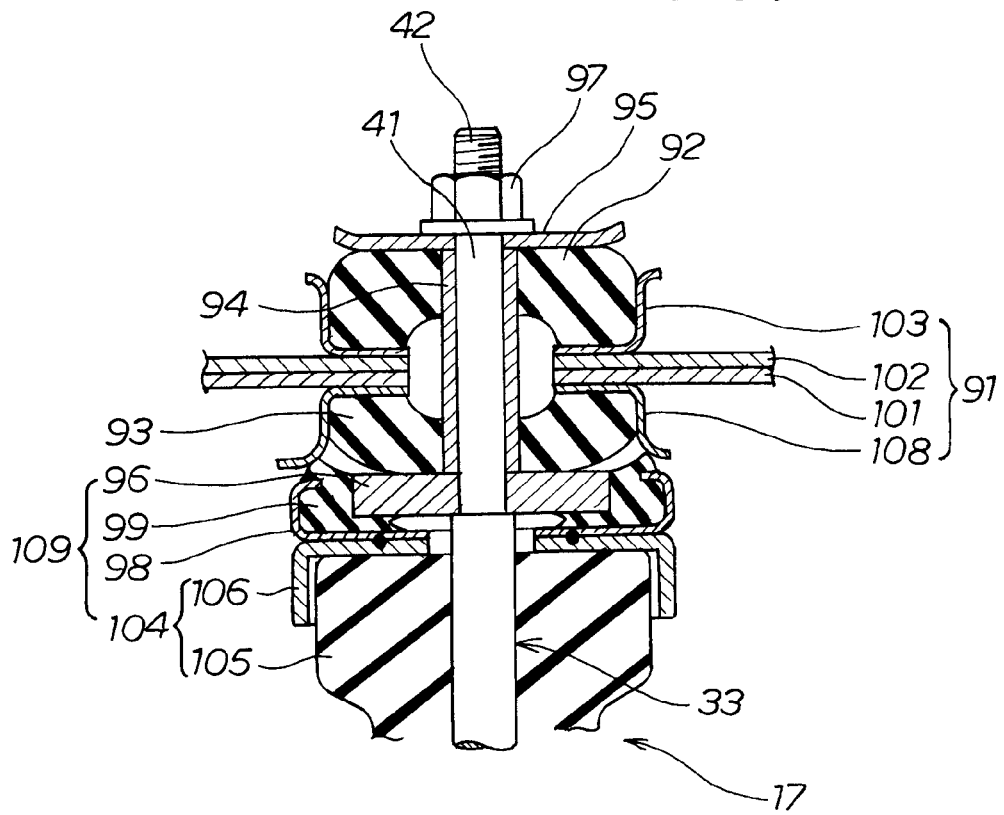
FIG. 7 is a sectional view showing a damper unit employing a third embodiment of the present invention.

FIG. 7 shows a third embodiment of the damper mount structure. Similar elements to those in the first embodiment of the damper mount structure (FIG. 3) are indicated by the same reference numerals as used for the first embodiment and will not be described here to avoid unnecessary duplication.

The third embodiment of the damper mount structure shown in FIG. 7 includes: upper and lower elastic sections 92 and 93 sandwiching therebetween a vehicle-body-side member 91; a collar member 94 threaded over the reduced-diameter section 41 and extending through the upper and lower elastic sections 92 and 93 to thereby define the tightening margin of the upper and lower elastic sections 92 and 93; upper and lower sandwiching members 95 and 96 threaded over the reduced-diameter section 41 and sandwiching therebetween the upper and lower elastic sections 92 and 93 from outside; a fastening member 97 screwed on the male screw section 42 to collectively fasten the upper and lower sandwiching members 95 and 96, collar ember 94 and upper and lower elastic sections 92 and 93 to the reduced-diameter section 41; a transmission member 98 provided concentrically with the piston rod 33 for transmitting an input from the damper body 38 (FIG. 2) to the vehicle-body-side member 91; a connecting elastic section 99 abutting against the vehicle-body-side member 91 and elastically interconnecting the transmission member 98 and the lower sandwiching member 96; and a bump stopper 104 provided under the transmission member 98 for lessening an input from the damper body 38.

The vehicle-body-side member 91 includes an inner panel 101, an outer panel 102, an upper holder section 103 accommodating therein the upper elastic section 92, and a lower holder section 108 accommodating therein the lower elastic section 93. The bumper stopper 104 includes an elastic bump rubber 105 for not only restricting the maximum compressed stroke of the damper 17 but also lessening an input from the dumper body 38 (FIG. 2), and a case 106 retaining the bump rubber 105.

The lower sandwiching member 96 and the transmission member 98 are interconnected via the connecting elastic section 99, and the transmission member 98 is spot-welded to the case 106. Namely, the lower sandwiching member 96, the transmission member 98, the connecting elastic section 99, the bump rubber 105 and the case 106 are formed integrally to constitute a connecting elastic section assembly 109.

In the third embodiment of the damper mount structure, the damper 17 includes the bump stopper 104 threaded over the piston rod 33 for lessening an input from the damper body 38 (FIG. 2). The transmission member 98 is provided between the bump stopper 104 and the lower elastic section 93. Further, the connecting elastic section 99, abutting against the vehicle-body-side member 91 and elastically interconnecting the transmission member 98 and the lower sandwiching member 96, can attenuate vibration transmitted from the bump stopper 104. Further, with the connecting elastic section 99 elastically interconnecting the transmission member 98 and the lower sandwiching member 96, the input from the bump stopper 104 is hardly transmitted to the lower elastic section 93. In this way, the instant embodiment can secure a sufficient compression margin as the input-separation type damper mount.

Fourth Embodiment

Figure 8:
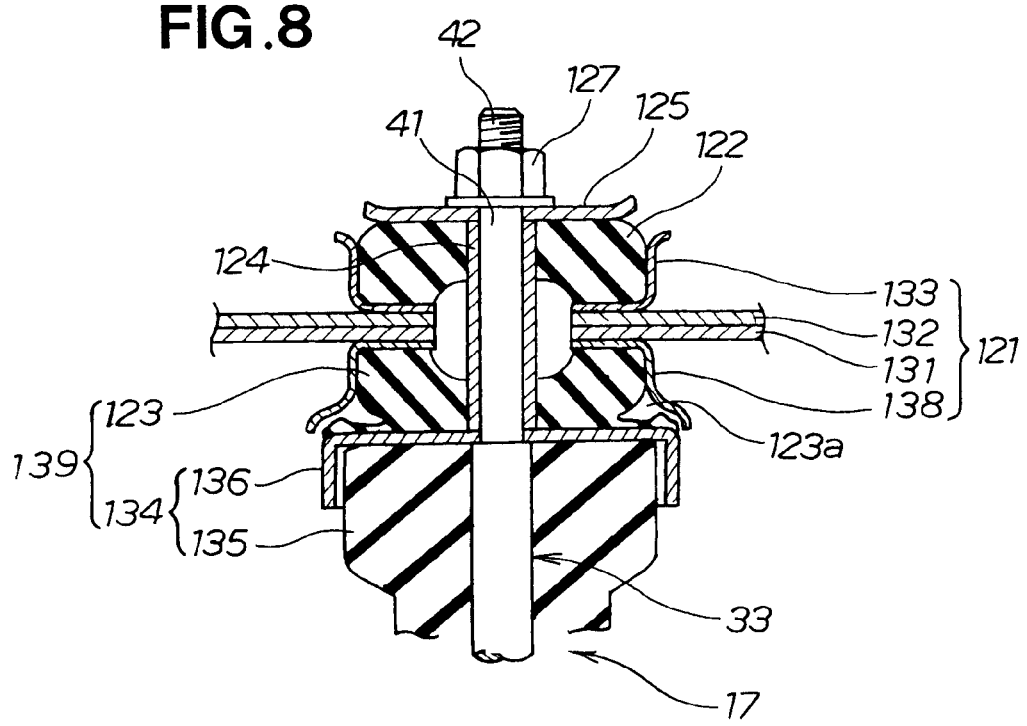
FIG. 8 is a sectional view showing a damper unit employing a fourth embodiment of the present invention.

FIG. 8 shows a fourth embodiment of the damper mount structure. Similar elements to those in the first embodiment of the damper mount structure (FIG. 3) are indicated by the same reference numerals as used for the first embodiment and will not be described here to avoid unnecessary duplication.

The fourth embodiment of the damper mount structure shown in FIG. 8 includes: upper and lower elastic sections 122 and 123 sandwiching therebetween a vehicle-body-side member 121; a collar member 124 threaded over the reduced-diameter section 41 and extending through the upper and lower elastic sections 122 and 123 to thereby define the tightening margin of the upper and lower elastic sections 122 and 123; an upper sandwiching member 125 threaded over the reduced-diameter section 41 and pressing against the upper elastic sections 122 from outside; a bump stopper 134 fitted over the female thread section 42 for lessening inputs from the upper sandwiching member 125 and damper body 38 (FIG. 2); and a fastening member 127 collectively fastening the collar member 124, upper and lower elastic sections 122 and 123 and bump stopper 134 to the reduced-diameter section 41.

The vehicle-body-side member 121 includes an inner panel 131, an outer panel 132, an upper holder section 133 having the upper elastic section 122 fitted therein, and a lower holder section 138 having the lower elastic section 123 fitted therein. The bumper stopper 134 includes an elastic bump rubber 135 for not only restricting the maximum compressed stroke of the damper 17 but also lessening an input from the dumper body 38 (FIG. 2), and a case 136 retaining the bump rubber 135.

The lower elastic section 123 is secured to the case 136 of the bumper stopper 134. Namely, the lower elastic section 123, the bump rubber 135 and the case 136 together constitute a bumper stopper assembly 139. Further, the lower elastic section 123 has a space portion 123*a* around its outer periphery adjacent to the case 136, so that an input from the case 136 is transmitted directly to the lower holder section 138 of the vehicle-body-side member 121.

The case 136 has also the transmission function of the transmission member 58 (FIG. 3) and the sandwiching function of the lower sandwiching member 56 (FIG. 3).

In the fourth embodiment of the damper mount structure, the bumper stopper 134 includes the bump rubber 135 for lessening an input from the dumper body 38 (FIG. 2), and the case 136 retaining the bump rubber 135. The case 136, also having the transmission function of the transmission member 58 (FIG. 3), can eliminate a need to provide a separate transmission member. As a result, it is possible to reduce the cost of the vehicle damper mount structure.

Fifth Embodiment

Figure 9:
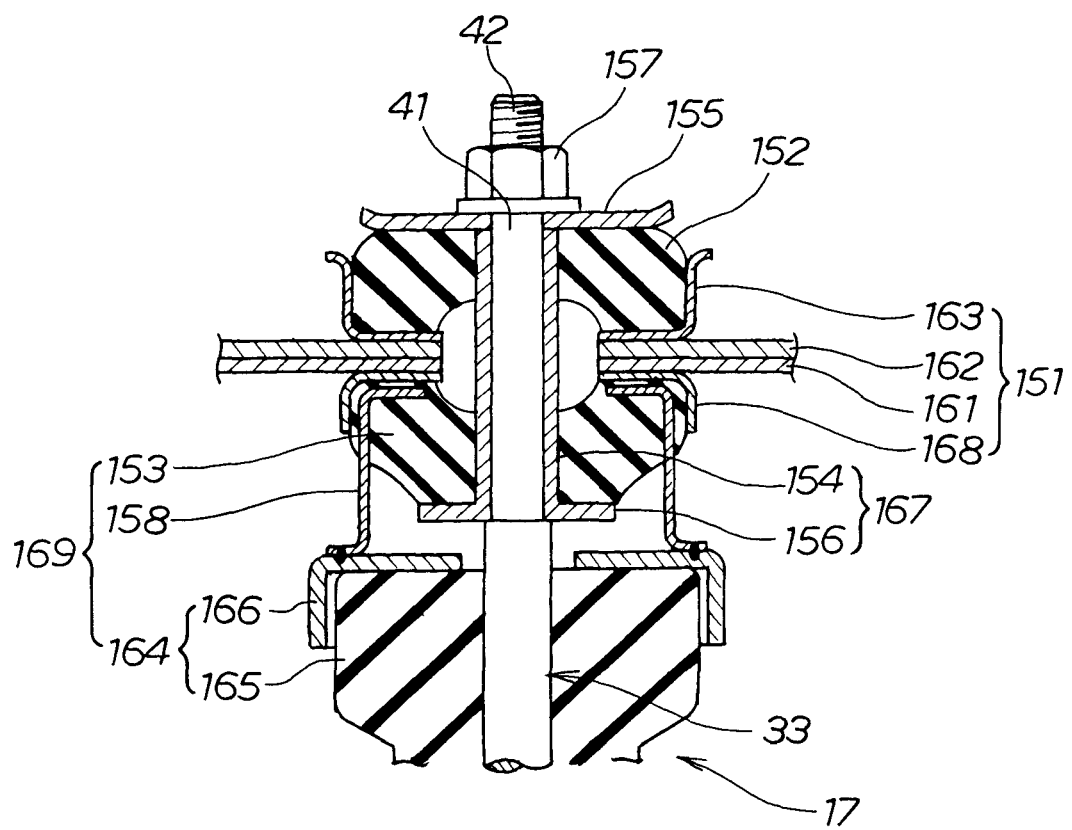
FIG. 9 is a sectional view showing a damper unit employing a fifth embodiment of the present invention.

FIG. 9 shows a fifth embodiment of the damper mount structure. Similar elements to those in the first embodiment of the damper mount structure (FIG. 3) are indicated by the same reference numerals as used for the first embodiment and will not be described here to avoid unnecessary duplication.

The fifth embodiment of the damper mount structure shown in FIG. 9 includes: upper and lower elastic sections 152 and 153 sandwiching therebetween a vehicle-body-side member 151; a collar member 94 threaded over the reduced-diameter section 41 and extending through the upper and lower elastic sections 152 and 153 to thereby define the tightening margin of the upper and lower elastic sections 152 and 153; upper and lower sandwiching members 155 and 156 threaded over the reduced-diameter section 41 and sandwiching therebetween the upper and lower elastic sections 152 and 153 from outside; a fastening member 157 screwed on the male screw section 42 to collectively fasten the upper and lower sandwiching members 155 and 156, collar ember 154 and upper and lower elastic sections 152 and 153 to the reduced-diameter section 41; a transmission member 158 provided concentrically with the piston rod 33 for transmitting an input from the damper body 38 (FIG. 2) to the vehiclebody-side member 151; and a bump stopper 164 provided under the transmission member 158 for lessening an input from the damper body 38.

The vehicle-body-side member 151 includes an inner panel 161, an outer panel 162, an upper holder section 163 having the upper elastic section 152 fitted therein, and a lower holder section 168 having the lower elastic section 153 fitted therein. The bumper stopper 164 includes an elastic bump rubber 165 for not only restricting the maximum compressed stroke of the damper 17 but also lessening an input from the dumper body 38 (FIG. 2), and the case 166 retaining the bump rubber 165.

The collar member 154 and the lower sandwiching member 156 are formed integrally with each other to constitute a flanged cylinder 167. The transmission member 158 is spot-welded to the case 166, and the transmission member 158 and the flanged cylinder 167 are interconnected via the lower elastic section 153. Namely, the transmission member 158, the collar member 154, the lower sandwiching member 156, the lower elastic section 163, the case 166 and the bump rubber 165 together constitute a bump rubber assembly 169.

Because the transmission member 158, the collar member 154, the lower sandwiching member 156, the lower elastic section 153 and the case 166 are formed integrally, the aforementioned arrangements of the fifth embodiment can achieve an improved assemblability of the damper mount structure.

Whereas the first embodiment of the vehicle damper mount structure has been described above in relation to the case where the piston rod 33 is mounted to the vehicle-body-side member 51, it is not so limited, and an end portion of the outer tube 31 may be mounted to the vehicle-body-side member 51.

INDUSTRIAL APPLICABILITY

The vehicle damper mount structure of the present invention is well suited for application to passenger vehicles, such as sedans and wagons.

LEGEND

16 . . . coil spring, 17 . . . damper body (vehicle damper), 33 . . . piston rod, 38 . . . damper body, 41 . . . reduced-diameter section, 42 . . . male thread section, 51 . . . vehicle-body-side member, 52, 53 . . . upper and lower elastic sections, 54 . . . collar member, 55, 56 . . . upper and lower sandwiching members, 57 . . . fastening member, 58 . . . transmission member, 63 . . . bracket, 91 . . . vehicle-body-side member, 93 . . . lower elastic section, 96 . . . lower sandwiching member, 98 . . . transmission member, 99 . . . connecting elastic section, 104 . . . bump stopper, 134 . . . bump stopper, 135 . . . bump rubber, 136 . . . case, 153 . . . lower elastic section, 154 . . . collar member, 156 . . . lower sandwiching member, 158 . . . transmission member, 166 . . . case

The invention claimed is:

1. A vehicle damper mount structure in which a damper comprises a damper body and a piston rod and the piston rod is supported at an end portion by a vehicle-body-side member,
characterized in that said vehicle damper mount structure comprises:
the piston rod having a reduced-diameter section having a smaller outer diameter than a remaining section of the piston rod, and a male thread section formed on a distal end portion of the reduced-diameter section;
upper and lower elastic sections threaded over the reduced-diameter section and sandwiching therebetween the vehicle-body-side member;
a collar member threaded over the reduced-diameter section and extending through the upper and lower elastic sections to thereby define a tightening margin of the upper and lower elastic sections;
upper and lower sandwiching members threaded over the reduced-diameter section and sandwiching therebetween the upper and lower elastic sections from outside;
a fastening member screwed on the male screw section to collectively fasten the upper and lower sandwiching members, the collar member and the upper and lower elastic sections to the reduced-diameter section; and
a transmission member, provided concentrically with the piston rod in such a manner as to astride over the lower elastic section axially of the piston rod, for transmitting an input from the damper body to the vehicle-body-side member without compressing the lower elastic section to above a predetermined value; and
a restraining section, provided to the vehicle-body-side member, for restraining movement of the transmission member owing to a load transmitted from the transmission member in an axial direction of the damper and in a direction normal to the axial direction.

2. The vehicle damper mount structure according to claim 1, wherein the damper includes a coil spring provided concentrically with the piston rod and supporting the vehicle-body-side member, and which further comprises a bracket provided underneath the transmission member for transmitting an input from the coil spring to the transmission member.

3. The vehicle damper mount structure according to claim 2, wherein the transmission member has an upper portion biting into and supported in the lower elastic section.

4. The vehicle damper mount structure according to claim 2, wherein the damper includes a bump stopper threaded over the piston rod for lessening an input from the damper body, and the transmission member is provided between the bump stopper and the lower elastic section, and
which further comprises a connecting elastic section abutting against the vehicle-body-side member and elastically interconnecting the transmission member and the lower sandwiching member.

5. The vehicle damper mount structure according to claim 2, wherein the bumper stopper includes a bump rubber for lessening an input from the dumper body, and a case retaining the bump rubber, and
wherein the case has also a transmission function of the transmission member.

6. The vehicle damper mount structure according to claim 2, wherein the transmission member, the collar member, the lower sandwiching member, the lower elastic section and the case are formed integrally.

7. The vehicle damper mount structure according to claim 1, wherein the transmission member has an upper portion biting into and supported in the lower elastic section.

8. The vehicle damper mount structure according to claim 7, wherein the damper includes a bump stopper threaded over the piston rod for lessening an input from the damper body, and the transmission member is provided between the bump stopper and the lower elastic section, and
which further comprises a connecting elastic section abutting against the vehicle-body-side member and elastically interconnecting the transmission member and the lower sandwiching member.

9. The vehicle damper mount structure according to claim 7, wherein the bumper stopper includes a bump rubber for lessening an input from the dumper body, and a case retaining the bump rubber, and wherein the case has also a transmission function of the transmission member.

10. The vehicle damper mount structure according to claim 7, wherein the transmission member, the collar member, the lower sandwiching member, the lower elastic section and the case are formed integrally.

11. The vehicle damper mount structure according to claim 1, wherein the damper includes a bump stopper threaded over the piston rod for lessening an input from the damper body, and the transmission member is provided between the bump stopper and the lower elastic section, and which further comprises a connecting elastic section abutting against the vehicle-body-side member and elastically interconnecting the transmission member and the lower sandwiching member.

12. The vehicle damper mount structure according to claim 11, wherein the bumper stopper includes a bump rubber for lessening an input from the dumper body, and a case retaining the bump rubber, and wherein the case has also a transmission function of the transmission member.

13. The vehicle damper mount structure according to claim 11, wherein the transmission member, the collar member, the lower sandwiching member, the lower elastic section and the case are formed integrally.

14. The vehicle damper mount structure according to claim 1, wherein the bumper stopper includes a bump rubber for lessening an input from the dumper body, and a case retaining the bump rubber, and wherein the case has also a transmission function of the transmission member.

15. The vehicle damper mount structure according to claim 14, wherein the transmission member, the collar member, the lower sandwiching member, the lower elastic section and the case are formed integrally.

16. The vehicle damper mount structure according to claim 1, wherein the transmission member, the collar member, the lower sandwiching member, the lower elastic section and the case are formed integrally.

* * * * *